C. H. WILLIAMS.
ADJUSTABLE THIRD OR FOURTH POINT SUPPORT FOR BRAKE BEAMS.
APPLICATION FILED JUNE 6, 1919.
1,352,570.
Patented Sept. 14, 1920.
2 SHEETS—SHEET 1.
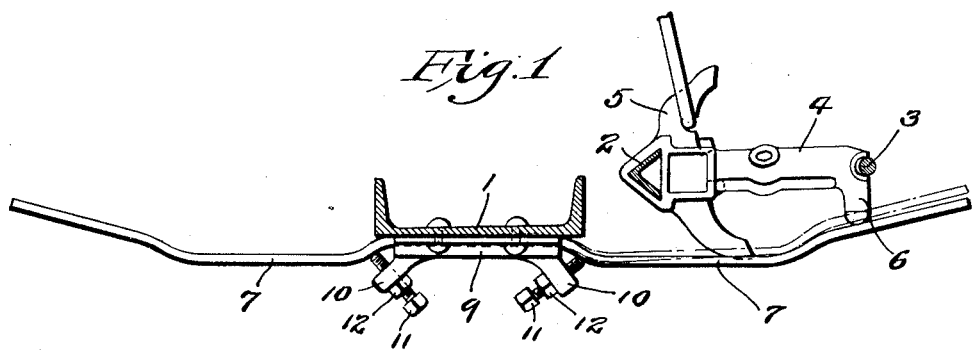
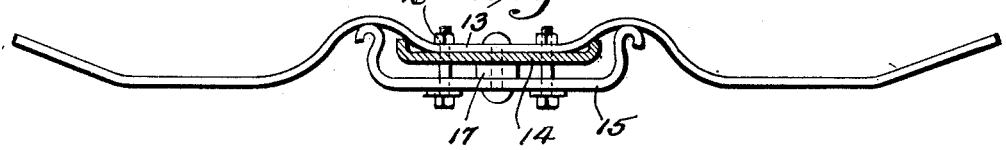
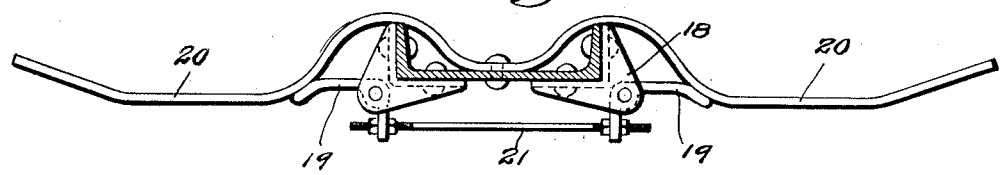
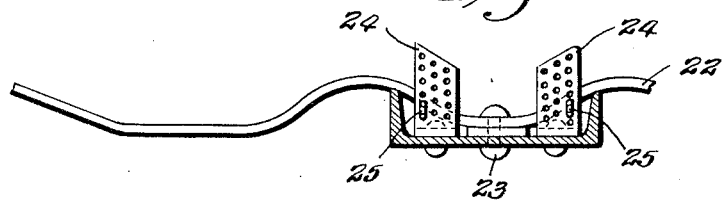 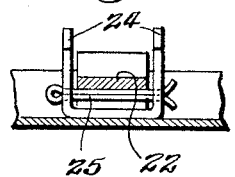
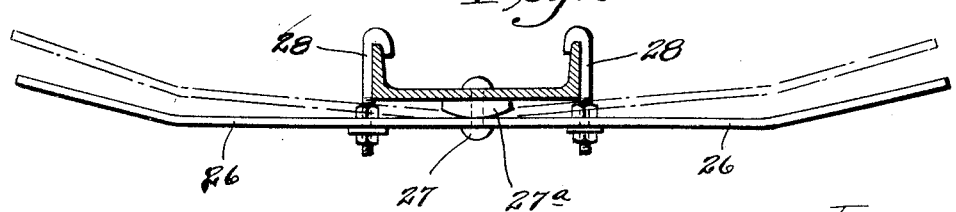
Inventor
Charles Haines Williams
By J. H. Conway, Atty.

C. H. WILLIAMS.
ADJUSTABLE THIRD OR FOURTH POINT SUPPORT FOR BRAKE BEAMS.
APPLICATION FILED JUNE 6, 1919.
1,352,570.
Patented Sept. 14, 1920.
2 SHEETS—SHEET 2.
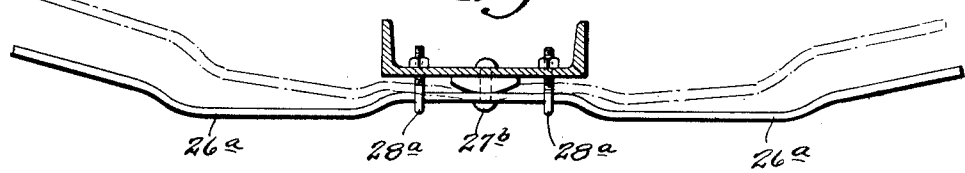
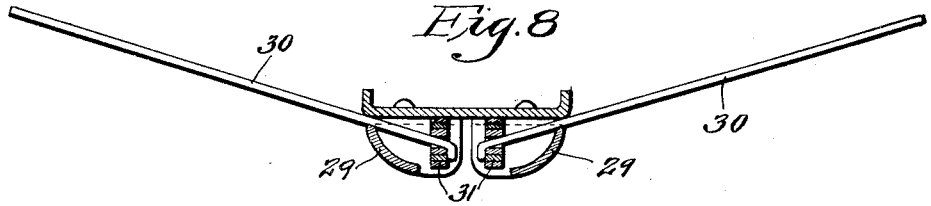
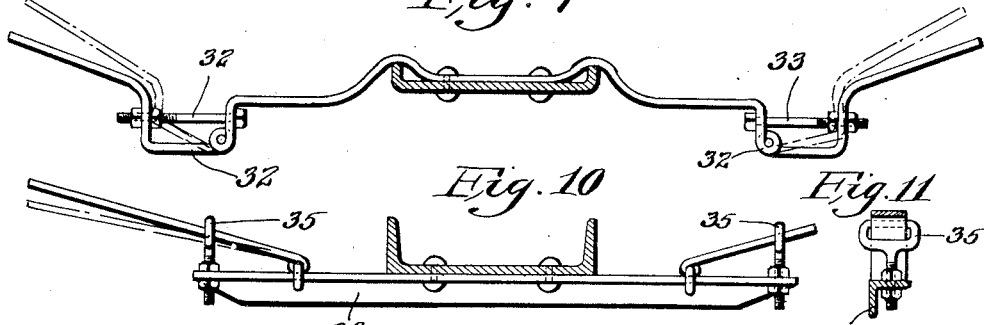
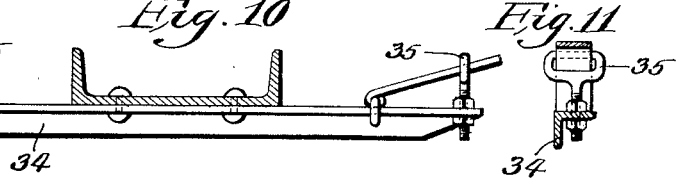 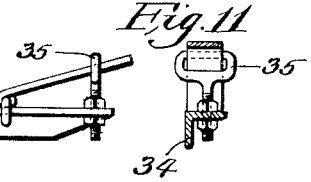
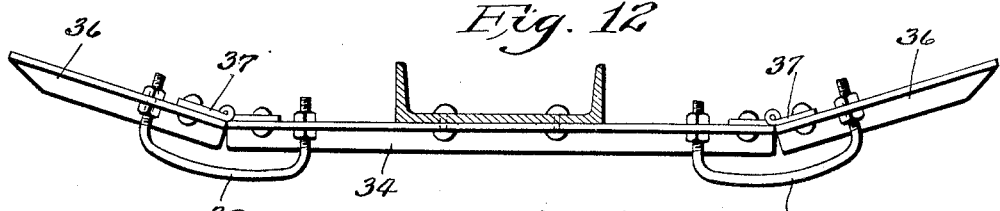
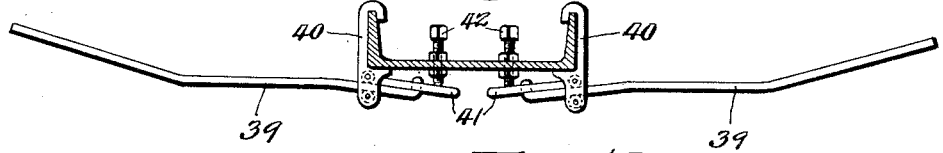
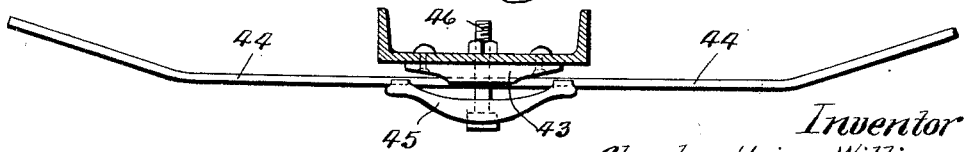
Inventor
Charles Haines Williams

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE THIRD OR FOURTH POINT SUPPORT FOR BRAKE-BEAMS.

1,352,570. Specification of Letters Patent. Patented Sept. 14, 1920.

Application filed June 6, 1919. Serial No. 302,225.

*To all whom it may concern:*

Be it known that I, CHARLES HAINES WILLIAMS, a citizen of the United States, residing at the city of Chicago, county of Cook, and State of Illinois, have invented a certain new and useful Improvement in Adjustable Third or Fourth Point Supports for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of one form of my improved adjustable third or fourth point support for brake beams.

Fig. 2 is a similar view of a modified form.

Fig. 3 is a similar view of another modified form.

Fig. 4 is a similar view of another modified form.

Fig. 5 is a detail elevational view of the modification shown in Fig. 4.

Fig. 6 is a side elevational view of another modified form.

Fig. 7 is a side elevational view of another modified form.

Fig. 8 is a side elevational view of another modified form.

Fig. 9 is a side elevational view of another modified form.

Fig. 10 is a side elevational view of another modified form.

Fig. 11 is a detail view of the modification shown in Fig. 10.

Fig. 12 is a side elevational view of another modified form.

Fig. 13 is a side elevational view of another modified form; and,

Fig. 14 is a side elevational view of another modified form.

This invention relates to a new and useful improvement in adjustable third or fourth point supports for brake beams, the object being to vertically adjust and adapt the track or support on which the chair member carried by the beams slides to different heights and thereby accommodating the beam to different diameters of wheels and to different makes of trucks.

In the drawings, 1 indicates the spring plank, 2 the compression member of a brake beam, 3 the tension member thereof, 4 the strut and 5 the brake head. This brake beam is shown as having a supporting chair or member 6 in the form of a third point support, but it is obvious that my present invention is as readily adaptable to fourth point supports.

The purpose of this supporting chair 6 operating on the inclined track is to guide the brake beam so that the brake shoe will be properly applied to the tread of the wheel and be uniformly worn, as is well known in devices of this kind.

7 is a track supporting member 6 which track may be made of yielding material, such as spring steel, and which, in Fig. 1, is secured in position on the spring plank by means of rivets 8. 9 is a casting having perforated lugs or ears 10 at its extremities through which pass adjusting screws 11, said adjusting screws having lock nuts 12 thereon. By turning these screws, it is possible to adjust the track member 7 as indicated by dotted lines at the right in Fig. 1, or by turning down the set screws, the track member may be lowered.

In Fig. 2, I have shown a modified form in which the track member 13 is secured above the spring plank 14, there being a yoke 15 bearing under the free ends of the track member 13 on each side of the spring plank, said yoke being adjustably held in position by means of nuts 16. A spacing block 17 is employed to support the yoke 15 in place and provide a fulcrum for the yielding ends thereof.

In Fig. 3, I have shown brackets 18 secured to the spring plank of the truck and in which are bell-cranks members 19 bearing at their outer extremities under the yielding track member 20 of the third or fourth point supporting element, the downwardly extending members of the bell-crank levers 19 being connected by a bolt 21, which is held in position by lock nuts, as shown.

In Fig. 4, I have shown another modification in which the yielding track member 22 is secured at one point to the spring plank, preferably, at its center, by means of a rivet 23, while on each side of said point of attachment there are perforated U-shaped plates 24 through which pass cotter pins 25 capable of being adjusted in the different holes in the plates 24, and thereby raise or permit the extremities of the track member 22 to be lowered.

In Fig. 6 I have shown a track member 26 secured to the underside of the spring plank by means of a rivet 27 and spacer 27ª. Bolts 28 carried by the spring plank engage the track member 26 on each side of its point of attachment so that each end of said track may be adjusted upwardly or downwardly by turning the nuts on said bolts.

In Fig. 7 I have shown the track member 26ª secured at one point to the underside of the spring plank by means of a rivet 27ᵇ, there being adjustable stirrup bolts 28ª on each side of the point of attachment of the track member 26ª, whereby each end of said track member may be adjusted upwardly or downwardly.

In Fig. 8, I have shown a casting 29 designed to be secured under the spring plank and in which the track member 30 is mounted, this track member coöperating with shims or liners 31 arranged within the casting and holding the end thereof in position. By increasing the number of these shims or liners above or below the inner end of the track plate, its outer end may be adjusted.

In Fig. 9, I have shown a form of adjustment in which there is a jog or bend 32 in the track member and a bolt 33 spanning said jog or bend, whereby the outer end of the track member may be adjusted.

In Fig. 10, I have shown a track member as being mounted on a rigid supporting or safety bar 34, the inner end of said track member being hinged or riveted to the safety bar and coöperating with an eye bolt 35 which is mounted for vertical adjustment in the outer end of a safety bar 34.

In Fig. 12, I have shown track member 36 as having a hinged joint 37 and a U-shaped bolt 38 by which the outer hinged extremities may be adjusted.

In Fig. 13, I have shown track member 39 as being hinged to a bracket 40 secured to the spring plank and having a member 41 bearing on the inner end thereof, which member 41 is adjustable by means of a set screw 42 held in place by jam nuts.

In Fig. 14, I have shown the casting 43 secured to the underside of the spring plank, the end face of which casting is provided with a groove for receiving the track member 44. A saddle 45 straddles casting 43 and is drawn up by means of a bolt 46 by which the ends of the track member may be adjusted vertically.

I do not in this application claim the hinge arrangement of the support, shown in Figs. 9 to 12 inclusive, as the same forms the subject matter of a divisional application, filed by me, May 27, 1920, Serial No. 384,592.

What I claim is:

1. The combination of a supporting track for third or fourth point supports for brake beams, the inner end of which is fastened to a part of the truck and the outer end of which supporting track is free and vertically adjustable, and means for adjusting said free outer end without disturbing the fastened portion.

2. The combination of a part of a truck, a track member for supporting a third or fourth point support for brake beams mounted thereon and having yielding relation therewith, and means arranged on said truck part and coöperating with said track member for vertically adjusting the free end of the latter.

In testimony whereof I hereunto affix my signature this 28th day of May, 1919.

CHARLES HAINES WILLIAMS.